US010518658B1

(12) United States Patent
Eakins et al.

(10) Patent No.: US 10,518,658 B1
(45) Date of Patent: Dec. 31, 2019

(54) ELECTRICAL VEHICLE BATTERY RECHARGING VEHICLE-SIDE RECEPTACLE UNIT

(71) Applicant: ABB Schweiz AG, Baden (CH)

(72) Inventors: William J. Eakins, Coventry, CT (US); Gregory A. Cole, West Hartford, CT (US); Sangeun Choi, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/182,003

(22) Filed: Nov. 6, 2018

(51) Int. Cl.
| | |
|---|---|
| *H01R 13/447* | (2006.01) |
| *B60L 53/16* | (2019.01) |
| *H01R 43/26* | (2006.01) |
| *H02J 7/00* | (2006.01) |
| *H01R 13/629* | (2006.01) |
| *B60L 53/30* | (2019.01) |
| *B60L 55/00* | (2019.01) |
| *B60L 53/31* | (2019.01) |
| *B60L 53/14* | (2019.01) |
| *B60L 53/00* | (2019.01) |

(52) U.S. Cl.
CPC ............ *B60L 53/16* (2019.02); *H01R 13/447* (2013.01); *H01R 43/26* (2013.01); *B60L 53/00* (2019.02); *B60L 53/14* (2019.02); *B60L 53/30* (2019.02); *B60L 53/31* (2019.02); *B60L 55/00* (2019.02); *B60Y 2200/91* (2013.01); *H01R 13/629* (2013.01); *H01R 2201/26* (2013.01); *H02J 7/0045* (2013.01); *Y02T 10/7088* (2013.01)

(58) Field of Classification Search
CPC ............... H01R 13/629; H01R 13/447; H01R 2201/26; Y02T 10/7088; B60L 53/16; B60L 53/14; B60L 53/30; B60L 53/31; B60L 55/00; B60L 53/00
USPC ........... 439/34, 136, 296, 310; 320/109, 137
See application file for complete search history.

(56) References Cited

U.S. PATENT DOCUMENTS

| | | | |
|---|---|---|---|
| 2014/0333261 A1* | 11/2014 | Oh ..................... B60L 11/1827 | 320/109 |
| 2018/0001777 A1 | 1/2018 | Kilic | |

FOREIGN PATENT DOCUMENTS

| | | | | |
|---|---|---|---|---|
| DE | 102016008982 A1 * | 2/2017 | ............. | B60L 53/14 |
| DE | 102016008982 A1 | 2/2017 | | |
| DE | 102017007818 A1 * | 1/2018 | ........... | H02J 7/0042 |

(Continued)

*Primary Examiner* — Abdullah A Riyami
*Assistant Examiner* — Justin M Kratt
(74) *Attorney, Agent, or Firm* — Leydig, Voit & Mayer, Ltd.

(57) ABSTRACT

A vehicle-side receptacle unit is described that is positionable on an underside of an electrical vehicle (EV) and a method for operating such unit. The vehicle-side receptacle facilitates hands-free connection of a vehicle-side electrical connector with a floor unit electrical connector of a floor-positioned recharging unit. The vehicle-side receptacle unit includes a unit frame including a ground-facing surface, a sliding cover including a leading edge, and a gap containing an interface of the vehicle-side electrical connector. The sliding cover is arranged to linearly slide on a plane parallel with the ground-facing surface to guide, using the leading edge, a shuttle carrying the floor unit electrical connector toward the gap to facilitate a mating of corresponding electrical contacts of the vehicle-side electrical connector and the floor unit electrical connector.

20 Claims, 8 Drawing Sheets

(56) References Cited

FOREIGN PATENT DOCUMENTS

| DE | 102017007818 A1 | 1/2018 | |
| WO | WO 2019/060939 A1 | 4/2019 | |
| WO | WO-2019060939 A1 * | 4/2019 | .............. B60L 53/16 |

* cited by examiner

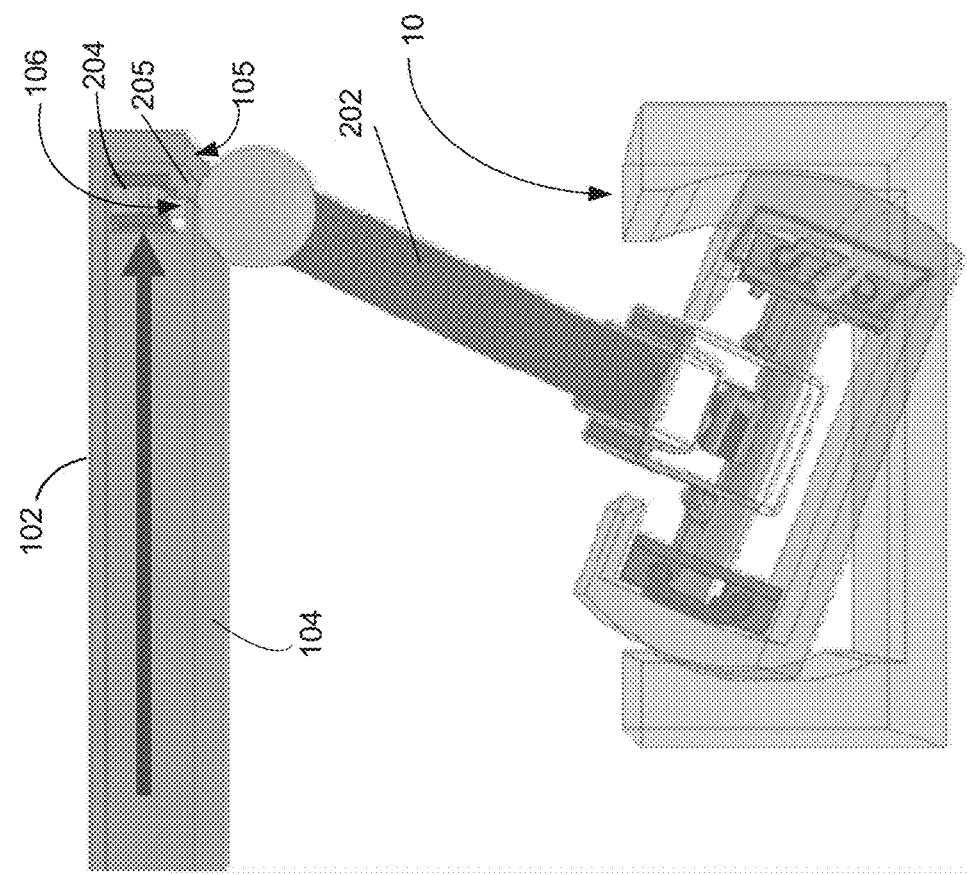
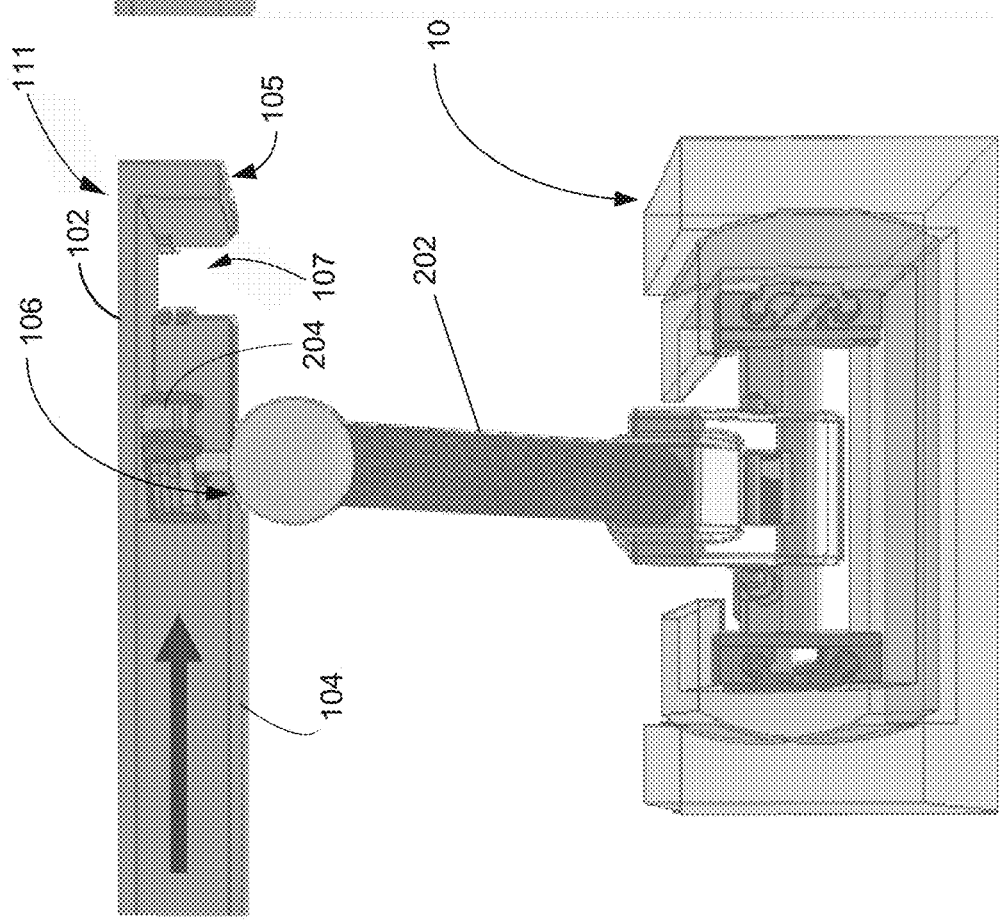
FIG. 5A
FIG. 5B

US 10,518,658 B1

ELECTRICAL VEHICLE BATTERY RECHARGING VEHICLE-SIDE RECEPTACLE UNIT

TECHNICAL FIELD

The present disclosure relates to recharging systems and methods for electric vehicles and, more particularly, to a vehicle-side receptacle unit and method for guiding prongs of a recharging station plug to a complementary receptacle of a physical recharging interface of an electric vehicle.

BACKGROUND

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical energy storage devices or batteries, which supply power to the vehicle propulsion and other systems. As can be appreciated, the vehicle batteries require recharging after usage.

At present, electric vehicle recharging is accomplished by connecting a recharging connector into a vehicle receptacle manually. The vehicle receptacle is usually located in the same or similar location as a vehicle fuel fill spout. Such locations are protected by doors or lids, much in the same way vehicle fill spouts are protected from environmental elements, dirt and road debris. However, with the advent of automated electric vehicle recharging systems, the vehicle charge receptacles may be located elsewhere in the vehicle, including areas that are commonly inaccessible to users such as beneath the vehicle.

SUMMARY OF THE DISCLOSURE

In one aspect, the disclosure describes a vehicle-side receptacle unit positionable on an underside of an electrical vehicle (EV) that facilitates hands-free connection of a vehicle-side electrical connector with a floor unit electrical connector of a floor-positioned recharging unit. More particularly, the vehicle-side receptacle unit includes a unit frame including a ground-facing surface, a sliding cover including a leading edge, and a gap containing an interface of the vehicle-side electrical connector. In accordance with the disclosure the sliding cover is arranged to linearly slide on a plane parallel with the ground-facing surface to guide, using the leading edge, a shuttle carrying the floor unit electrical connector toward the gap to facilitate a mating of corresponding electrical contacts of the vehicle-side electrical connector and the floor unit electrical connector.

In another aspect, the disclosure describes a hands-free method, carried out by a vehicle-side receptacle unit on an underside of an electrical vehicle (EV), for achieving an electrical connector mating between a vehicle-side electrical connector and a floor unit electrical connector of a floor-positioned recharging unit. The vehicle-side receptacle unit carrying out the method includes a unit frame including a ground-facing surface, a sliding cover including a leading edge, and a gap containing an interface of the vehicle-side electrical connector. In accordance with the disclosure the sliding cover is arranged to linearly slide on a plane parallel with the ground-facing surface to guide, using the leading edge, a shuttle carrying the floor unit electrical connector toward the gap to facilitate a mating of corresponding electrical contacts of the vehicle-side electrical connector and the floor unit electrical connector.

Further and alternative aspects and features of the disclosed principles will be appreciated from the following detailed description and the accompanying drawings. As will be appreciated, the principles related to systems, methods, and software for the automated cleaning of a vehicle-side recharging receptacle disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIGS. 5A and 5B depict before/after views of operation of the vehicle-side receptacle unit capturing a shuttle containing the electrical connector of the ground unit;

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
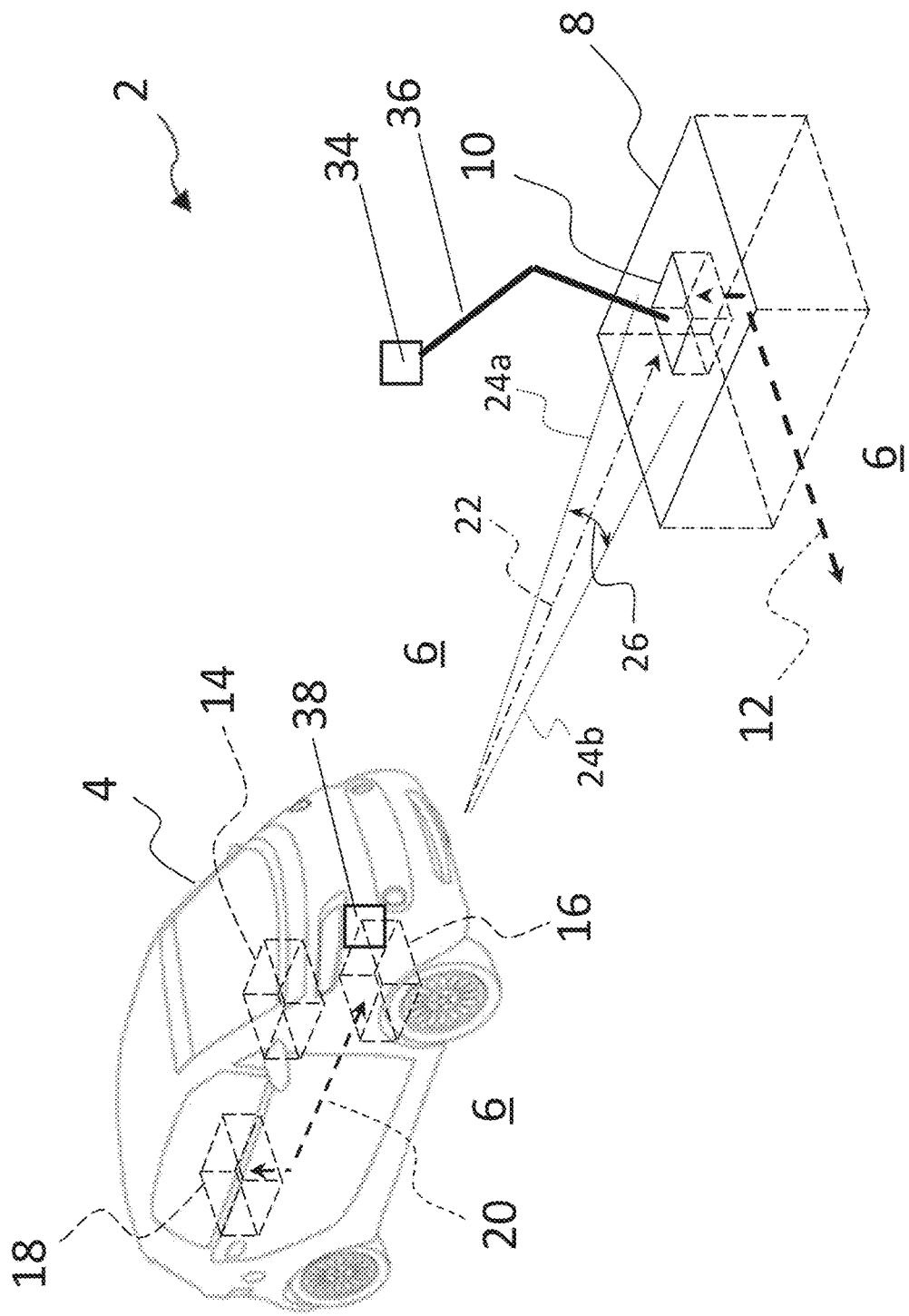
FIG. 1 is a perspective view of an electric vehicle (EV) recharging environment according to an embodiment of the disclosure.

FIG. 1 is a perspective view of an electric vehicle (EV) recharging environment 2 according to an embodiment of the disclosure. In the example shown in FIG. 1, an EV 4 is positioned on a ground surface 6. EV 4 is a car, as shown in FIG. 1. Alternatively, EV 4 may be a truck, a motorcycle, a moped, a bus, a farm implement or any other on- or off-highway vehicle. In the example shown, a ground surface 6 is a floor of a garage of a home or business. Alternatively, for example, the ground surface 6 is a surface of a parking lot. The recharging environment 2 includes a floor unit 8. The floor unit 8 is positioned on or, at least in part, beneath the ground surface 6. Thus, depending on the particular recharging station application, and also on a foreseeable ground clearance of various vehicles that will be recharged, the floor unit 8 may be fully or partially disposed beneath the ground surface, or may alternatively be disposed on the ground surface, for example, when installed on existing floors.

The floor unit 8 includes a connector unit 10. At least a portion of the connector unit 10 faces and is exposed or exposable to the ground surface 6. The connector unit 10 is operatively coupled to or associated with an electric power source (e.g., a commercial utility electrical power grid—not shown in FIG. 1). A first electric power 12 is thus provided by the electric power source to the connector unit 10 of the floor unit 8.

By way of example, the EV 4 includes a drive train 14 comprising one or more electric motors providing motive power to wheels of the EV 4. The EV 4 includes a vehicle-side receptacle unit 16 and at least one rechargeable power storage device (rechargeable battery) 18 that is recharged via a recharging circuitry (not depicted) of the EV 4 coupled to the connector unit 10 via the vehicle-side receptacle unit 16. Thus, during recharging of the EV 4, an electric power supply 20 is provided between vehicle unit 16 and battery 18.

The battery 18 is operatively coupled to the drive train 14 for providing electric power thereto to enable providing a motive power for propelling the EV 4 during operation. Specific structures and systems of the EV 4 that facilitate providing power to the drive train 14, as well as components of the drive train 14, are omitted for simplicity. It is noted, however, that in the illustrative examples provided, at least a portion of the vehicle-side receptacle unit 16 faces downward and is exposed or exposable to the ground surface 6. Furthermore, while the EV 4 is shown in one orientation as it approaches the floor unit 8, other orientations and approach directions are also contemplated.

In the EV recharging environment 2 depicted in FIG. 1, the EV 4 is driven and approaches the floor unit 8 that includes the connector unit 10. A driver of the EV 4 (e.g., a human driver and/or an autonomous vehicle driving system, not shown in FIG. 1) steers or otherwise controls the EV 4 while approaching the floor unit 8 along a centerline path 22. As shown in FIG. 1, the centerline path 22 extends from the EV 4 to at least approximately a center point of the connector unit 10 proximal the ground surface 6. Based on the particular dimensions and other specifications of the EV 4, the floor unit 8 including the connector unit 10, and/or the vehicle unit 16, an approach path of the EV 4 to the floor unit 8 may deviate from the target centerline path 22 by an allowable deviation. The allowable deviation may be in any direction, including but not limited to a horizontal or vertical direction. An allowable deviation includes a driver side deviation (indicated by a first line 24a) and a passenger side deviation (indicated by a second line 24b). Thus, in the illustrative example, an allowable deviation angle 26 is defined by the lines 24a and 25b on approach. An acceptable vertical deviation angle is also contemplated. Additionally, further allowable deviations are contemplated with regard to pitch, yaw and roll of the EV 4 in relation to the connector unit 10. It is thus evident, from the provided description, that the floor unit 8 generally supports a certain degree of variability in the physical relative positioning of the connector unit 10 and the vehicle-side receptacle unit 16 when establishing an electrical connection between an electrical connector 38 (e.g. female receptacle) of the vehicle-side receptacle unit 16 and an electrical connector 34 (e.g. a multi-pronged male plug-in connector) carried by a linkage system 36 of the floor unit 8. In operation, after the EV 4 is positioned above the floor unit 8, the linkage system 36 lifts the electrical connector 34 to an elevation that enables laterally repositioning and mating the electrical connector 34 with the receptacle of the vehicle-side receptacle unit 16.

Figure 2:
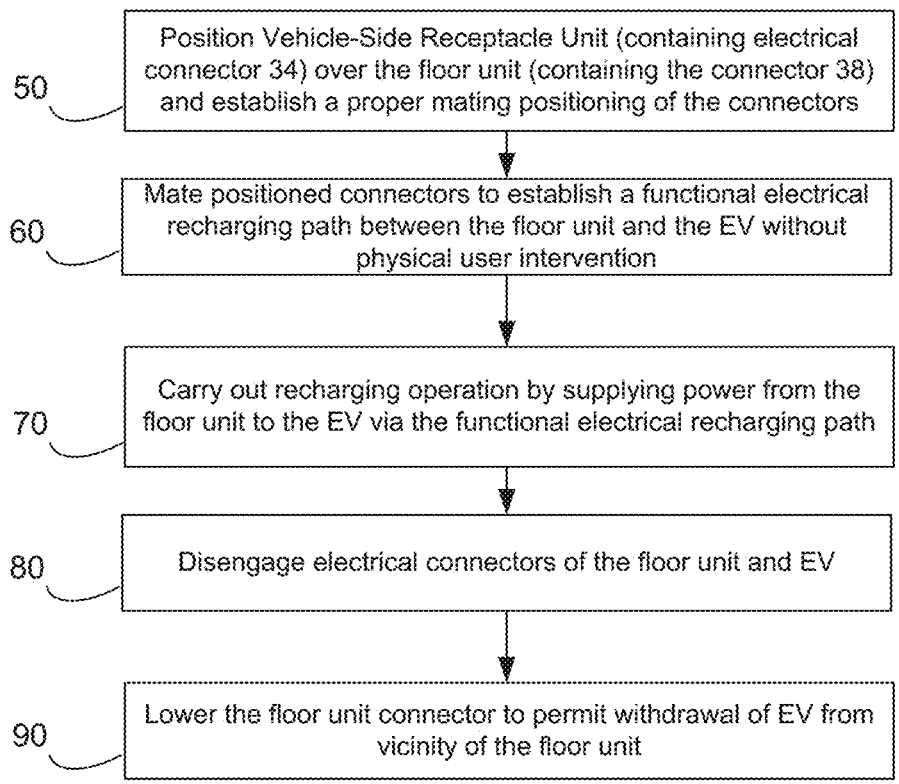
FIG. 2 is a flowchart of a method for recharging an EV containing a vehicle-side receptacle unit positioned on an underside of the EV according to an embodiment of the disclosure.

Turning to FIG. 2, a flowchart summarizes steps for a method for performing an underside recharging of the EV 4 according to an embodiment of the disclosure. In an illustrative example, the method is implemented and performed, at least in part, by the linkage system 36, which raises the electrical connector 34 from a retracted position near the floor 6 level and cooperatively interacts with physical features/elements of the vehicle-side receptacle unit 16 to affect a physical mating of complementary connective structures of the electrical connector 34 (e.g. plug prongs) and corresponding electrically conductive surfaces (female receptacle electrodes) of the electrical connector 38 of the vehicle-side receptacle unit 16.

With continued reference to FIG. 2, referring to the particularly identified stages of a recharging operation carried out in accordance with the environment depicted in FIG. 1, during 50 the EV 4 is positioned over the floor unit 8 (within a range of acceptable relative positions) and the electrical connector 34 and linkage 36 are raised and guided such that the electrical connector 34 is placed in a mating position in relation to the electrical connector 38 of the EV 4.

After establishing a mating positioning of the electrical connector 34 in relation to the electrical connector 38, during 60 a mating is affected with regard to the complementary electrically conductive electrodes/surfaces of the connector 34 and the connector 38. By way of example, both the electrical connector 34 and the electrical connector 38 include corresponding flush/surface contacts. However, another suitable arrangement utilizes male/female prong/receptacle connectors. For example, the electrical connector 38 is a female/receptacle and the electrical connector 34 is a multi-pronged plug, and the mating of the connectors is achieved by inserting the prongs of the connector 34 into the receptacle openings of the connector 38. Alternatively, the electrical connector 34 comprises the female/receptacle and the electrical connector 38 comprises a multi-pronged plug. The positioning and mating of the electrical connector 34 with the electrical connector 38, as will be explained further herein below, is carried out without a user physically intervening.

After mating the connectors, during 70, power is supplied by the floor unit 8 to the vehicle-side receptacle unit 16 of the EV 4 to carry out a recharging operation of the battery 18. Thereafter, during 80, the electrical connector 34 and the electrical connector 38 are disengaged, and during 90 the connector 34 is lowered to permit withdrawal of the EV 4 from the vicinity of the floor unit 8.

Figure 3:
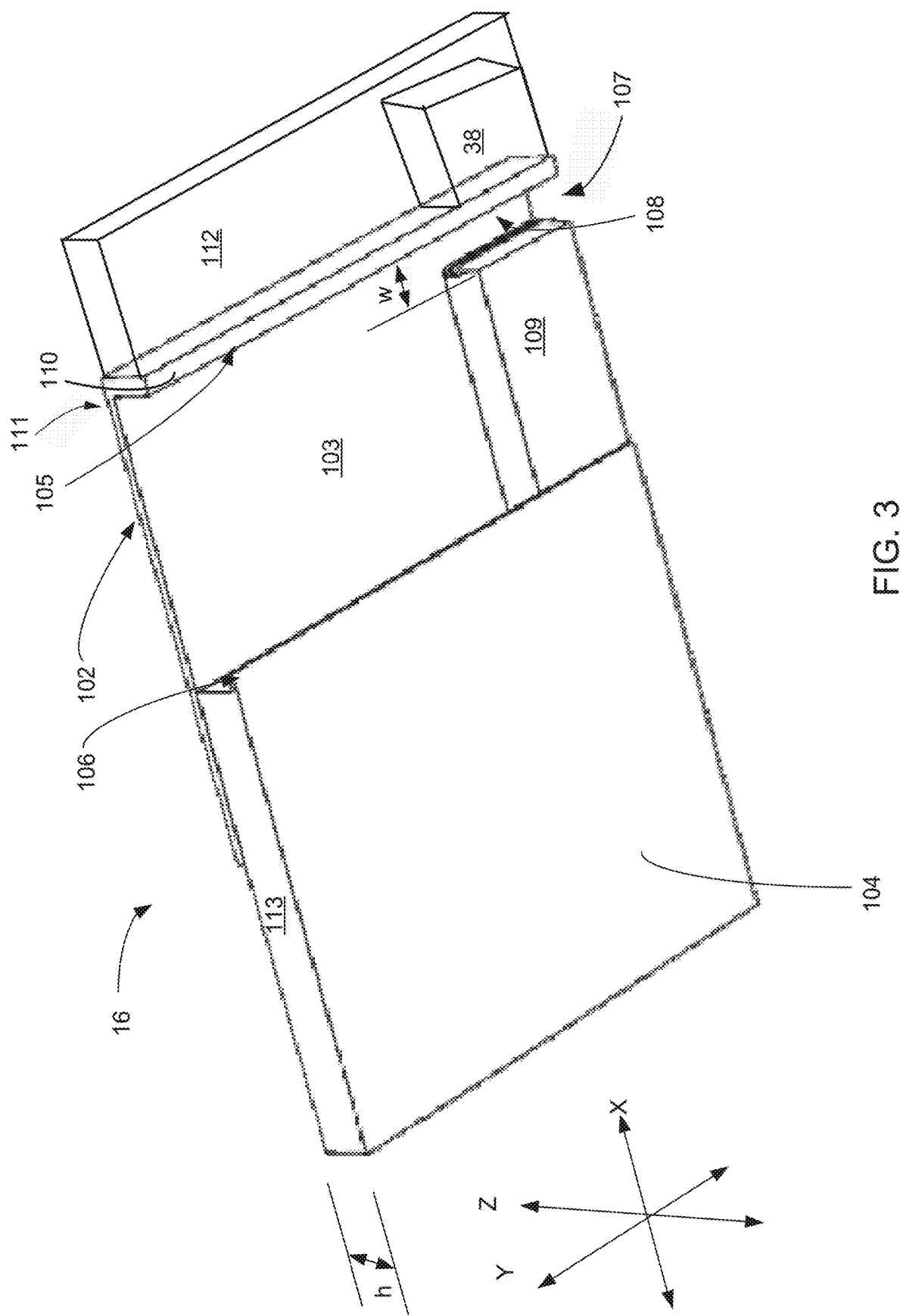
FIG. 3 is a schematic view from a bottom perspective of a vehicle-side receptacle unit in accordance with the disclosure.

Turning to FIG. 3, an illustrative example is provided of the vehicle-side receptacle unit 16 previously discussed herein above with reference to FIG. 1. The detailed example of the vehicle-side receptacle unit 16 is shown in isolation (and perspective view) for clarity and from a bottom perspective. The vehicle-side receptacle unit 16 includes a unit frame 102. The unit frame 102 is securely attached to an undercarriage (not shown) of the EV 4. The unit frame 102 in the illustrated example has a generally rectangular shape. The unit frame 102 is dimensioned to serve as a platform, holder and protector of various components of the vehicle-side receptacle unit 16 described further herein below. The unit frame 102 supports a motor driven sliding cover 104. The sliding cover 104 is moved, in response to a control signal, to expose a ground-facing surface 103 of the unit frame 102. In the illustrative example, the sliding cover 104, when retracted, covers and protects exposed surfaces of the electrical connector 38 (e.g. female receptacle) described previously herein above with reference to FIG. 1. The unit frame 102 and sliding cover 104 are constructed of materials that enable protection of electrical components and to withstand harsh environmental conditions to which the underside of the EV 4 are subjected (e.g. dirt, ice, saltwater, mud, oil, etc.).

In the illustrative example, the sliding cover 104 includes a cover leading edge 106 that runs the width of the sliding door 104 (and the unit frame 102). The cover leading edge 106 is dimensioned/formed such that: (1) closing the sliding cover 104 naturally forces the connector 34 of the floor unit 8 to a connection-ready orientation against an end-wall 105 of the unit frame 102 (the connection being completed between the contact pads/leads of the connector 34 of the floor unit 8 and the connector 38 of the vehicle-side receptacle unit 16 when the connector 34 is drawn into a gap 107 (having a width "w") to affect a mating between the connector 34 and the connector 38 of the vehicle-side receptacle unit 16; and (2) a near-complete closing of the sliding cover 104, in relation to the end-wall 105 (see FIGS. 5A and 5B), forms a groove 205 (See FIG. 5B) between the cover leading edge 106 and a parallel edge 110 of the end-wall 105. The groove 205 traps the connector 34 (and the linkage 36) to facilitate drawing/guiding the connector 34 into the gap 107 to affect a mating of the electrical connector 34 contacts/leads with a corresponding set of contacts/leads of the electrical connector 38. By way of example, the connector 34 is forced by a connector actuator unit 109 into the mating relation with the connector 38. However, in an alternative example, the connectors utilize a contact pad arrangement. In such instances, mating of the connector 34 with the connector 38 is affected by simply pulling/positioning the connector 34 in the gap 107 and does not require the aid of the connector actuator unit 109 to mate corresponding contacts/leads of the connector 34 and the connector 38. A variety of ways and structures are contemplated for performing a final positioning of the connector 34 in a mated relationship with the connector 38—as well as separating the mated connectors upon completion of the recharging operation in accordance with an exemplary method described herein below with reference to FIG. 6.

In the illustrative example, the electrical connector 38 as well as other electronic components are enclosed within an electronics compartment 112 attached or otherwise functionally and/or structurally integrated with the vehicle-side connector 38. The electronics compartment 112 includes electronic components that facilitate controlling and providing (including conditioning) electrical power received from the ground unit 8 via the connection between the electrical connector 34 and the electrical connector 38. The electronic components housed within the electronics compartment 112 also facilitate transmission/reception of control signals and information between the EV 4 and the floor unit 8 and/or the connector unit 10. The charge receptacle interface 108 of the electrical connector 38 forms a gap with a corresponding inner surface of the end-wall 105. The width "w" of the gap 107 formed between the receptacle interface 108 and the end-wall 105 is sized to facilitate a mating/disengagement of complementary conductive surfaces/elements of the electrical connector 34 and the electrical 38 during the recharging operation summarized in FIG. 2.

In the illustrative example provided in FIG. 3, the compartment 112 is not enclosed by the sliding cover 104 when the gap between the cover leading edge 106 and the parallel edge 110 is closed (i.e. the sliding cover 104 is completely closed with respect to the unit frame 102). Such complete closure is the normal position of the sliding cover 104 when the EV 4 is not engaged with the floor unit 8 to perform a recharging operation. In an alternative example, the electronics compartment 112 is located with the compartment containing the connector actuator unit 109. In such case, by sizing the sliding cover 104 such that (in the closed position) it covers the electronics compartment 112 (located with the connector actuator unit 109, the sliding cover 104 is provides additional protection for the potentially sensitive/breakable electronic circuit components housed in the electronics compartment 112 from road debris and other potentially damaging objects and structures encountered while driving the EV 4. In the illustrative example in FIG. 3, the electronics compartment 112 has a hardened case that is capable of withstanding road debris strikes and other extreme forces.

Rails and a linear actuator (not shown) may be disposed between the unit frame 102 and the sliding cover 104 to aid/guide actuation of the slide the cover 104 between the closed and open positions in relation to the unit frame 102. The rails, actuator and/or other components may be mounted to one or both of the unit frame 102 and the sliding cover 104. The sliding cover 104, in the illustrative example depicted in FIG. 3, occupies a volume within its footprint in the longitudinal (X) direction and also in a perpendicular or transverse direction (Y), and the vertical direction (Z), which as shown is occupied by the height "h", of the sliding cover 104, as denoted visually by the side 113 of the sliding cover 104 depicted in FIG. 3.

At one longitudinal end 111, the unit frame 102 includes the end-wall 105, which extends perpendicularly away from the ground-facing surface 103 of the unit frame 102. The end-wall 105 has a height that is generally the same as the height of the sliding cover 104. However, having the height of the end-wall 105 be slightly less than the height of the sliding cover 104 facilitates an overlapping engagement between the cover leading edge 106 surface of the sliding cover 104 that faces the unit frame 102, and the parallel edge 110 of the end-wall 105. The overlapping engagement between the cover leading edge 106 and the parallel edge in the X-Y plane provides additional structural integrity for the vehicle-side receptacle unit 16 while the sliding cover 104 is in a closed position with respect to the unit frame 102.

Figure 4:
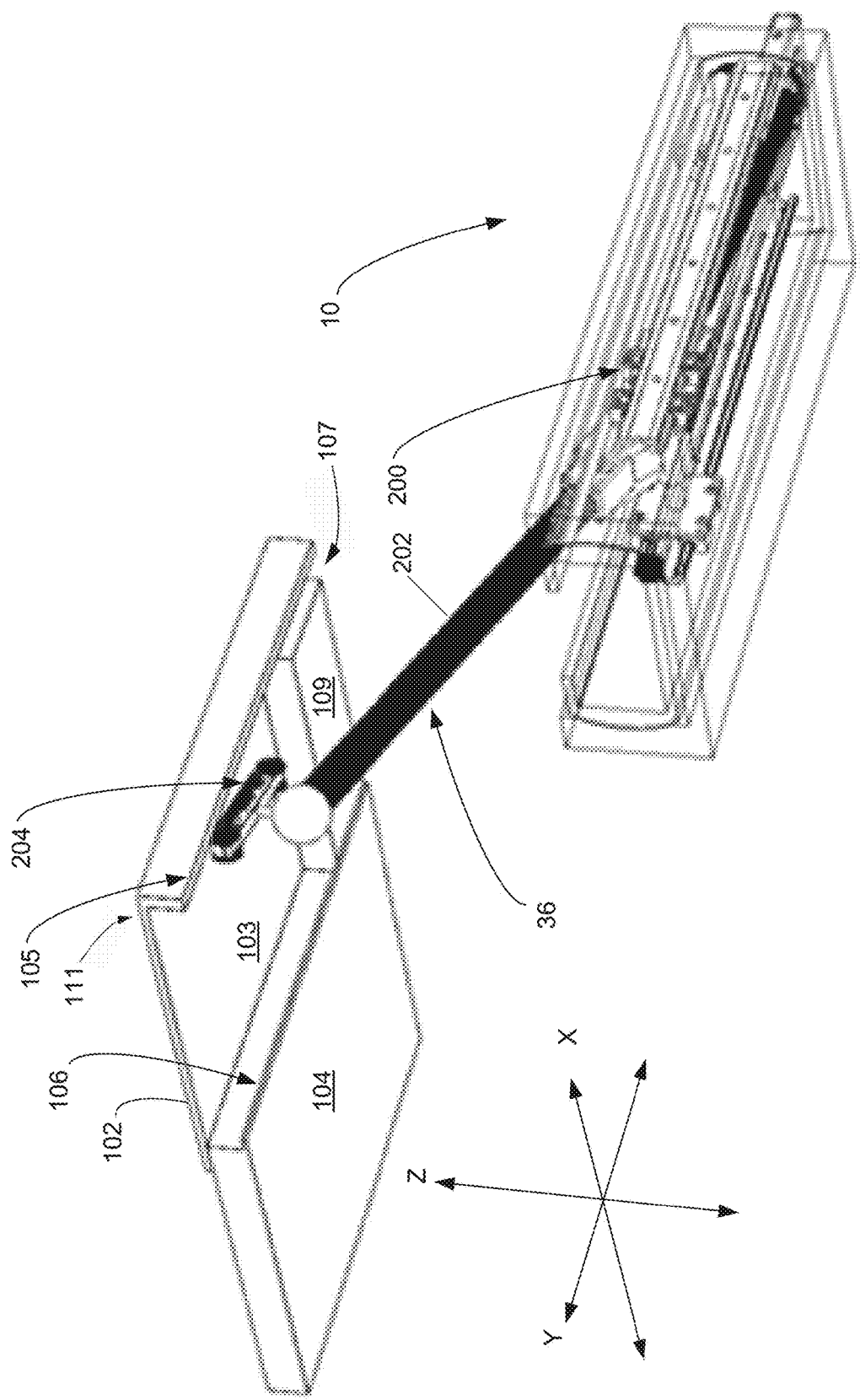
FIG. 4 is an outline view of a linkage system of a ground unit that interacts with the vehicle-side receptacle unit in accordance with the disclosure.

Turning to FIG. 4, in reference to the recharging environment depicted in FIG. 1, the linkage system 36 is integrated with the connector unit 10. The linkage system 36 includes an actuator assembly 200 that is connected to and permits/causes an arm 202 to move and/or rotate in various directions relative to X, Y and Z axes. A shuttle 204, which carries the electrical connector 34, is disposed at the end of the arm 202 and is moved thereby and through the action of the actuator assembly 200 to contact and selectively traverse the ground-facing surface 103 of the unit frame 102, as shown in FIG. 4. The direction of travel of the shuttle 204 is thus determined by: (1) operation of the actuator assembly 200, (2) the linkage system 36, and (3) relative positioning of the sliding cover 104 and the ground-facing surface 103. By way of example, the arm 202 elevates the shuttle 204 (with respect to the Z axis) and causes the shuttle 204 to move transversely (in the X-Y plane) relative to the ground-facing surface 103. Additionally, the sliding cover 104 is actuated (in the direction shown by the arrows in FIGS. 5A and 5B) to close a space between the cover leading edge 106 and the end-wall 105. During such closing, the edge 106 moves the shuttle 204 along the X-axis of the ground-facing surface 103 towards the end-wall 105. Moreover, the actuator assembly 200 itself is movable along the Y-axis to draw the shuttle 204 carrying the electrical connector 34 into the gap 107 to affect a mating of electrical conductive contacts of the electrical connector 34 of the ground unit 8 and the electrical connector 38 of the EV 4 to facilitate commencement of recharging operation of the battery 18 by the ground unit 8. Moreover, upon completion of a recharging operation, the actuator assembly 200 is controlled to move in the opposite direction along the Y-axis to withdraw the shuttle 204 (and connector 34 carried thereby) from the gap 107.

Figure 6:
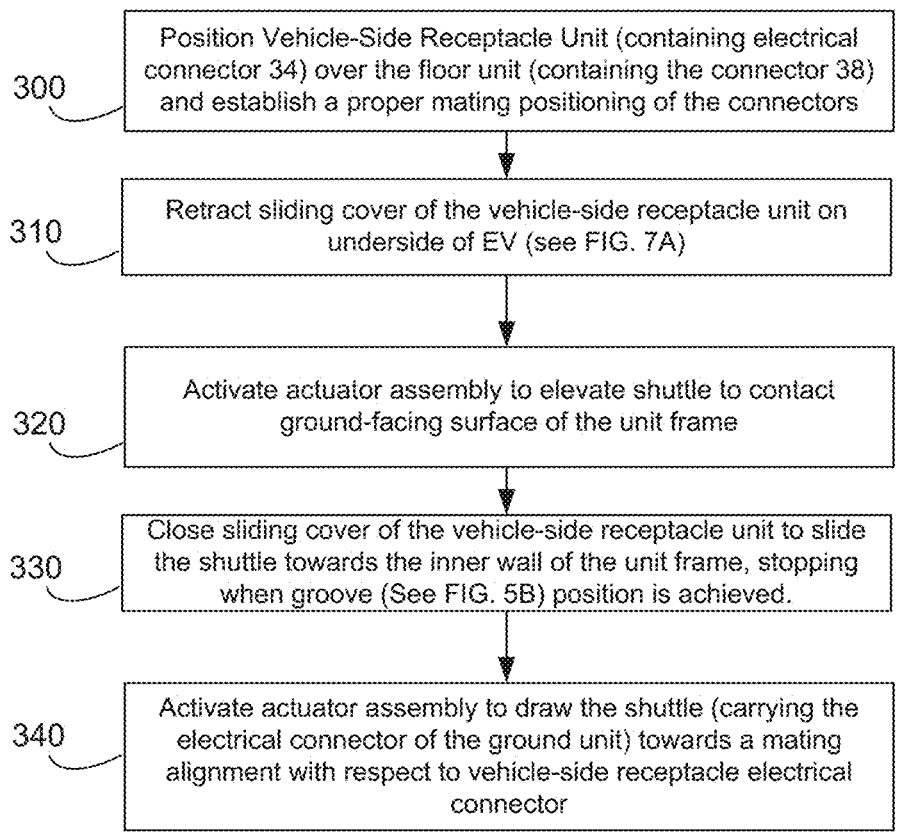
FIG. 6 is a flowchart for one embodiment of a method of mating complementary connectors in the ground unit and the vehicle-side receptacle unit using the linkage system and vehicle-side receptacle of FIGS. 3 and 4.

Turning to FIG. 6, a flowchart summarizes operation of the vehicle-side receptacle unit 16 operating with the linkage system 36 and actuator assembly 200 to achieve a mating relationship between the electrical contacts/leads of the connector 34 of the floor unit 8 and the connector 38 of the vehicle-side receptacle unit 16. During the description of the steps of FIG. 6, reference is made to illustrative schematic drawings in FIGS. 7a-d showing positioning of the connector 34 and elements of the vehicle-side receptacle unit 16 during a described stage. During 300, the EV 4 is positioned over the floor unit within a range of acceptable relative positions to facilitate carrying out a mating of corresponding contacts of the connector 34 and the connector 38 through actuation of the electrical connector 34 and linkage 36.

Figure 7A:
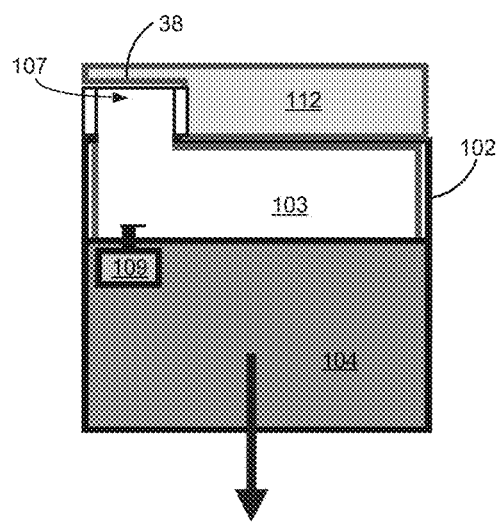
FIGS. 7A-F are a sequence of schematic drawings corresponding to various states of operation/positioning of the elements depicted in FIG. 3 in accordance with the operations described in FIG. 6.

Next, during 310, the vehicle-side receptacle unit 16 causes the sliding cover 104 to be retracted to expose the ground-facing surface 103 as shown in FIG. 7A.

Figure 7B:
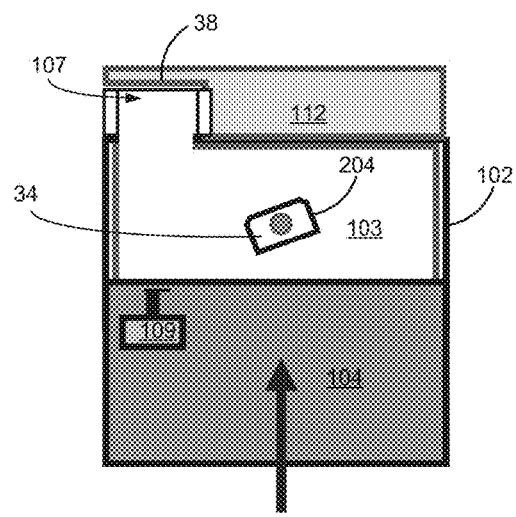
Figure 7C:
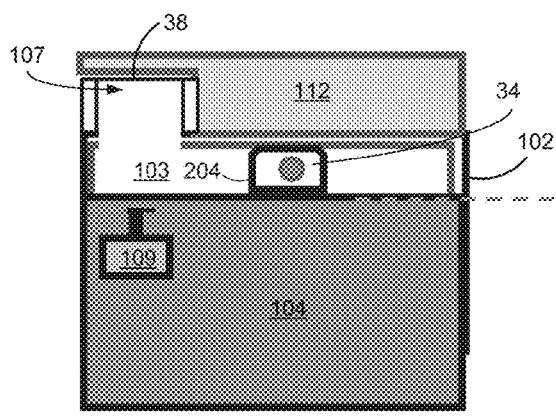
Figure 7D:
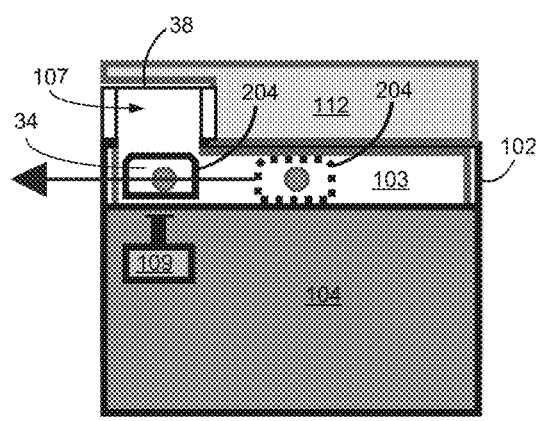

During 320 the ground unit 10 activates and causes the shuttle 204 carrying the electrical connector 34 to be raised by the actuator assembly 200 and guided such that the electrical connector 34 is placed proximate (or on) the ground-facing surface 103 of the unit frame 102. This initial positioning of the electrical connector 34 is depicted in FIG. 7B.

During 330 the vehicle-side receptacle unit initiates a closing of the sliding cover 104 in accordance with the before/after depictions of the operation set forth in FIGS. 5A and 5B. Upon completion of 330, the shuttle 204 is positioned alongside the end-wall 105 and a groove 205 is formed by the edge 106 and the end-wall 105 (see FIG. 7C).

Figure 7E:
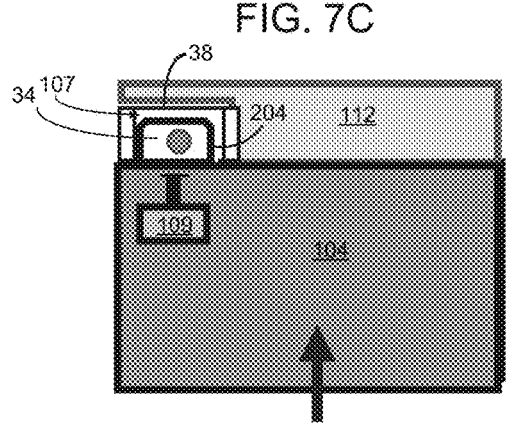

After achieving a positioning of the shuttle 204 against the end-wall 105 and formation of a linear groove (to guide the shuttle to the gap 107), during 340 the actuator assembly 200 is activated to draw the shuttle 204 that carries the electrical connector 34 into the gap 107. See FIG. 7D. Upon completion of 340, the shuttle is properly positioned/seated within the gap 107 so as to affect, by action of the connector actuator unit 109, a mating alignment between corresponding contacts of the electrical connector 34 of the ground unit 8 and the electrical connector 38 of the vehicle-side receptacle unit 16. At this point, the EV 4 and ground unit 8 may commence recharging. In the illustrative example provided herein, the connector actuator unit 109 affects a mating by pushing the connector 34 laterally into an engaged relationship with the electrical connector 38 in accordance with the schematic drawing set forth in FIG. 7E. In an alternative example, wherein the connector 34 and the connector 38 comprise contact pads—as opposed to male/female plug/receptacle structures—a mating relationship may be achieved simply by bringing the connector 34 into the position depicted in FIG. 7D.

Figure 7F:
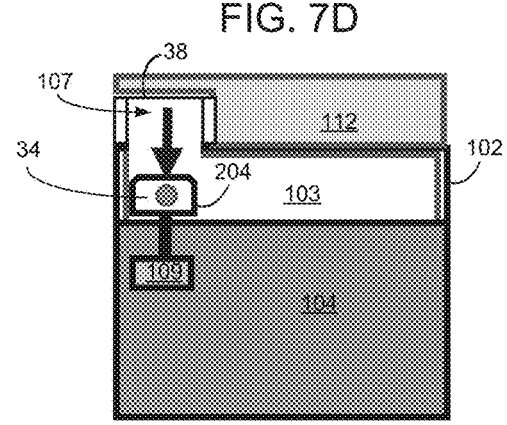

Upon completion of the recharging operation, the sliding cover 104 is retracted sufficiently to permit extraction (e.g., laterally pulling by the connector actuator unit 109 as shown in FIG. 7F) and lowering of the shuttle 204 from the vehicle-side receptacle unit 16.

Figure 8:
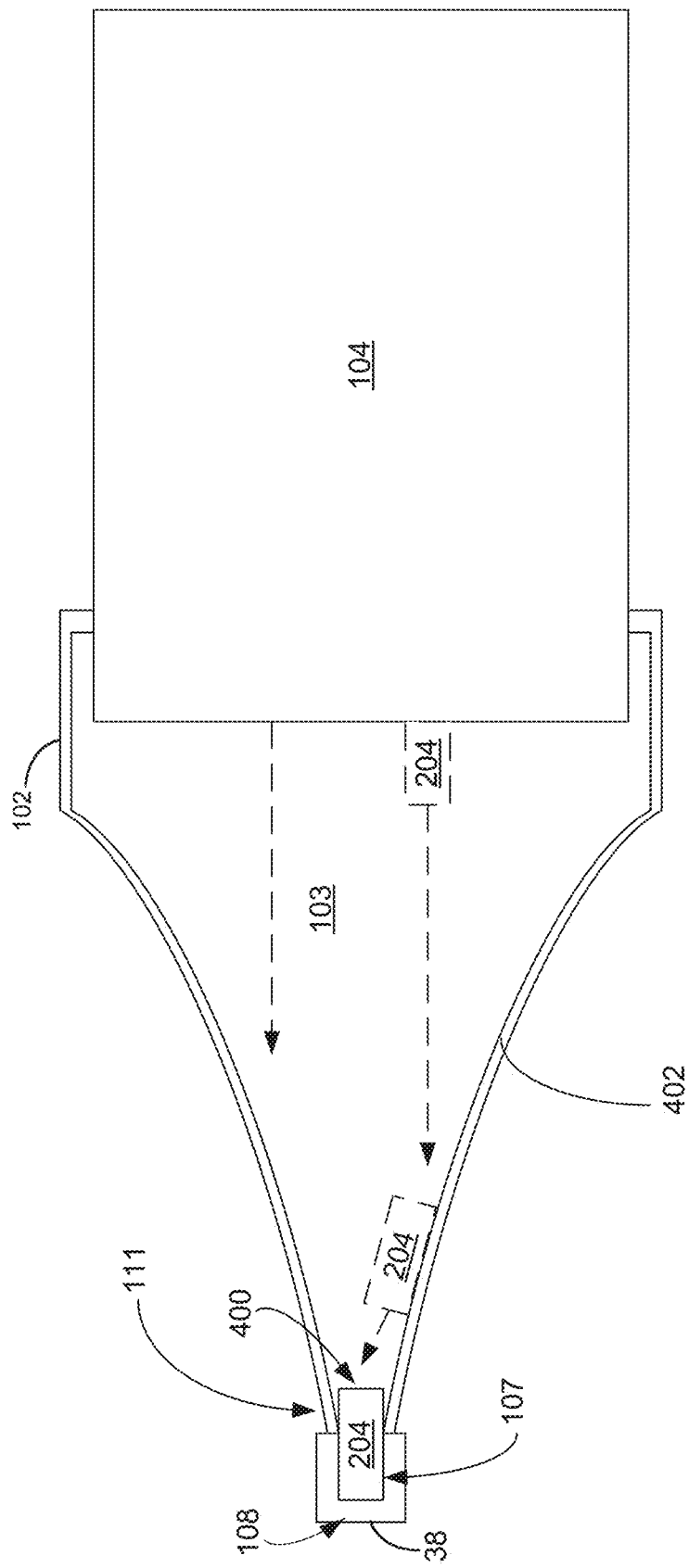
FIG. 8 is an alternative configuration of the vehicle-side receptacle unit depicted in FIG. 3.

Turning to FIG. 8, an alternative arrangement of the vehicle-side receptacle unit 16 is provided wherein the unit frame 102 has walls that provide the ground-facing surface 103 having a tapered (e.g. funnel-like) shape that extends the full width of the sliding cover edge 106 at an end distal the gap 107. However, the ground-facing surface 103 narrows to an opening 400 proximal the gap 107 that is sized to guide the shuttle 204 into the gap 107 to enable achieving a mating relationship between electrical contacts of the electrical connector 34 (carried by the shuttle 204) of the floor unit 8 and the electrical connector 38 of the EV 4.

Thus, in a first exemplary mode of operation, actuating the sliding cover 104 pushes the linkage arm carrying the shuttle 204 to cause the shuttle 204 to slide along the surface 103 toward the gap 107. At an intermediate point in the connector-mating process, the sliding shuttle 204 contacts the edge 402 of the unit frame 102. Continued closure of the sliding cover 104 causes the shuttle 204 to pass through the opening 400 and achieve a seated position wherein the shuttle fills the gap 107 thereby mating the corresponding contacts/leads of the electrical connectors 34 and 38. Alternatively, movement of the shuttle 204 to the seated position within the gap 107 is achieved solely by operation of the actuator assembly 200 that pulls the linkage system 36 and the shuttle 204 along the path shown in FIG. 7 without the aid of pushing by the sliding cover 104. When a recharging operation is complete, the shuttle 204 is withdrawn from the gap 107 by force of the actuator assembly 200 to permit the EV 4 to leave the recharging facility.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vehicle-side receptacle unit for an electric vehicle (EV) positioned on a ground surface, the vehicle-side receptacle unit positionable on an underside of the EV to facilitate hands-free connection of a vehicle-side electrical connector with a floor unit electrical connector of a floor-positioned recharging unit, the vehicle-side receptacle unit comprising:

a unit frame defining a longitudinal direction, a transverse direction, and a vertical direction, the unit frame including a ground-facing surface;

a motor driven sliding cover supported by, and slidably disposed on, the unit frame plane-parallel with, and spaced vertically from, the ground-facing surface, the sliding cover including a transverse leading edge facing one longitudinal end of the unit frame; and a gap defined between two unit frame surfaces extending vertically away from two respective portions of the ground-facing surface proximal the one longitudinal end, the gap containing an interface of the vehicle-side electrical connector, wherein the sliding cover is arranged to linearly slide longitudinally toward the one longitudinal end to guide, using the leading edge, a shuttle carrying the floor unit electrical connector toward the gap to facilitate a mating of corresponding electrical contacts of the vehicle-side electrical connector and the floor unit electrical connector.

2. The vehicle-side receptacle unit of claim 1 wherein the unit frame further comprises an end-wall, and wherein the end-wall is configured to cooperate with the leading edge of the sliding cover to form a groove for guiding the shuttle along a path defined by the groove that leads to the gap.

3. The vehicle-side receptacle unit of claim 2, wherein the gap is positioned at an end of the groove.

4. The vehicle-side receptacle unit of claim 2 wherein the leading edge overlaps an upper edge of the end-wall when the sliding cover is in a closed position.

5. The vehicle-side receptacle unit of claim 1 wherein the ground-facing surface is rectangular.

6. The vehicle-side receptacle unit of claim 1 wherein the ground-facing surface has a tapered profile that narrows to a width of the gap.

7. The vehicle-side receptacle unit of claim 1 wherein the unit frame and the sliding cover are arranged to form a closed space when the sliding cover is in a closed position.

8. The vehicle-side receptacle unit of claim 7 further comprising: an electronics compartment, and wherein the electronics compartment is positioned within the closed space formed by the unit frame and the sliding cover in the closed position.

9. The vehicle-side receptacle unit of claim 1 wherein the leading edge is disposed a distance from the ground-facing surface that exceeds a height of the shuttle.

10. The vehicle-side receptacle unit of claim 1 wherein the gap has a width sufficient to accommodate insertion of the floor unit electrical connector to achieve a mating relationship with the vehicle-side electrical connector.

11. A hands-free method, carried out by a vehicle-side receptacle unit on an underside of an electrical vehicle (EV) positioned on a ground surface, for achieving an electrical connector mating between a vehicle-side electrical connector and a floor unit electrical connector of a floor-positioned recharging unit, wherein the vehicle-side receptacle unit comprises:

a unit frame defining a longitudinal direction, a transverse direction, and a vertical direction, the unit frame including a ground-facing surface;

a motor driven sliding cover supported by, and slidably disposed on, the unit frame plane-parallel with, and spaced vertically from, the ground-facing surface, the sliding cover including a transverse leading edge facing one longitudinal end of the unit frame; and a gap defined between two unit frame surfaces extending vertically away from the two respective portions of the ground-facing surface proximal the one longitudinal end, the gap containing an interface of the vehicle-side electrical connector, and wherein the method comprises:

receiving a shuttle carrying the floor unit electrical connector on the ground-facing surface; and linearly actuating the sliding cover in the longitudinal direction toward the one longitudinal end to guide, using the leading edge, the shuttle carrying the floor unit electrical connector toward the gap to facilitate a mating of corresponding electrical contacts of the vehicle-side electrical connector and the floor unit electrical connector.

12. The method of claim 11 wherein the unit frame further comprises an end-wall, and wherein the end-wall is configured to cooperate with the leading edge of the sliding cover to form a groove for guiding the shuttle along a path defined by the groove that leads to the gap.

13. The method of claim 12, wherein the gap is positioned at an end of the groove.

14. The method of claim 12 wherein the leading edge overlaps an upper edge of the end-wall when the sliding cover is in a closed position.

15. The method of claim 11 wherein the ground-facing surface is rectangular.

16. The method of claim 11 wherein the ground-facing surface has a tapered profile that narrows to a width of the gap.

17. The method of claim 11 wherein the unit frame and the sliding cover are arranged to form a closed space when the sliding cover is in a closed position.

18. The method of claim 17 further comprising: an electronics compartment, and wherein the electronics compartment is positioned within the closed space formed by the unit frame and the sliding cover in the closed position.

19. The method of claim 11 wherein the leading edge is disposed a distance from the ground-facing surface that exceeds a height of the shuttle.

20. The method of claim 11 wherein the gap has a width sufficient to accommodate insertion of the floor unit electrical connector to achieve a mating relationship with the vehicle-side electrical connector.

* * * * *